(12) United States Patent
Park et al.

(10) Patent No.: US 9,429,988 B2
(45) Date of Patent: Aug. 30, 2016

(54) TOUCH SCREEN PANEL

(71) Applicants: Jung-Mok Park, Yongin (KR);
Hyung-Chul Kim, Yongin (KR);
Chang-Bum Kim, Yongin (KR);
Jae-Hyung Jo, Yongin (KR)

(72) Inventors: Jung-Mok Park, Yongin (KR);
Hyung-Chul Kim, Yongin (KR);
Chang-Bum Kim, Yongin (KR);
Jae-Hyung Jo, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 111 days.

(21) Appl. No.: 13/933,180

(22) Filed: Jul. 2, 2013

(65) Prior Publication Data
US 2014/0204286 A1 Jul. 24, 2014

(30) Foreign Application Priority Data
Jan. 24, 2013 (KR) .................. 10-2013-0008053

(51) Int. Cl.
*G06F 1/16* (2006.01)
*G06F 3/041* (2006.01)

(52) U.S. Cl.
CPC .......... *G06F 1/1626* (2013.01); *G06F 1/1643* (2013.01); *G06F 3/041* (2013.01); *G06F 2203/04103* (2013.01)

(58) Field of Classification Search
CPC ................ G06F 3/042; G06F 3/044

USPC .................................. 345/173–176
See application file for complete search history.

(56) References Cited

U.S. PATENT DOCUMENTS

| | | | | |
|---|---|---|---|---|
| 2011/0006316 A1* | 1/2011 | Ing et al. | ......................... | 257/89 |
| 2011/0242057 A1* | 10/2011 | Lee et al. | ...................... | 345/176 |
| 2011/0242058 A1* | 10/2011 | Lee et al. | ...................... | 345/176 |
| 2012/0026107 A1* | 2/2012 | Kim et al. | .................... | 345/173 |
| 2012/0113032 A1 | 5/2012 | Itakura et al. | | |
| 2012/0146921 A1* | 6/2012 | Park | ............................. | 345/173 |
| 2012/0154725 A1* | 6/2012 | Jeon et al. | ..................... | 349/110 |
| 2013/0285938 A1* | 10/2013 | Kang | ..................... | G06F 3/041 |
| | | | | 345/173 |

FOREIGN PATENT DOCUMENTS

| | | |
|---|---|---|
| KR | 10-1048974 B1 | 7/2011 |
| KR | 10-2012-0048854 A | 5/2012 |
| KR | 10-2012-0067031 A | 6/2012 |
| KR | 10-2012-0090500 A | 8/2012 |

* cited by examiner

*Primary Examiner* — Chanh Nguyen
*Assistant Examiner* — Daniel Duong
(74) *Attorney, Agent, or Firm* — Lee & Morse, P.C.

(57) ABSTRACT

A touch screen panel includes a window substrate divided into an active area and a non-active area, the non-active area being outside the active area, the window substrate having a first printed layer formed in the non-active area, a touch substrate including sensing electrodes formed in the active area and having a second printed layer that faces the first printed layer formed in the non-active area, and an adhesive layer interposed between the window substrate and the touch substrate.

16 Claims, 4 Drawing Sheets

TOUCH SCREEN PANEL

CROSS-REFERENCE TO RELATED APPLICATION

This application claims priority to and the benefit of Korean Patent Application No. 10-2013-0008053, filed on Jan. 24, 2013, in the Korean Intellectual Property Office, and entitled: "TOUCH SCREEN PANEL," which is incorporated by reference herein in its entirety.

BACKGROUND

1. Field

Embodiments relate to a touch screen panel.

2. Description of the Related Art

A touch screen panel may be used as an input device for selecting indicated content displayed on the screen of an image display device by a human hand or an object to input a command of a user. The touch screen panel may be provided on the front face of the image display device to convert a contact position of the human hand or the object into an electrical signal. The indicated content selected in the contact position may be received as an input signal.

SUMMARY

Embodiments are directed to a touch screen panel, including a window substrate divided into an active area and a non-active area, the non-active area being outside the active area, the window substrate having a first printed layer formed in the non-active area, a touch substrate including sensing electrodes formed in the active area and having a second printed layer that faces the first printed layer formed in the non-active area, and an adhesive layer interposed between the window substrate and the touch substrate.

At least one of the first and second printed layers may have a multi-layer structure.

The first and second printed layers may have different colors.

The first and second printed layers may have the same thickness.

The touch substrate may further include outside wiring lines formed in the non-active area and coupled to the sensing electrodes.

The sensing electrodes and the outside wiring lines may be formed in the same layer.

The touch substrate may further include reflecting patterns formed between the outside wiring lines.

The outside wiring lines may include one or more of Ag, Ni, Cu, Mo/Al/Mo, or an Ag—Pd—Cu alloy.

The adhesive layer may be formed of an optically clear adhesive.

One surface of the adhesive layer may cover the first printed layer and another surface of the adhesive layer may cover the second printed layer.

The adhesive layer may have a thickness of about 50 μm to about 200 μm.

A light scattering layer may be formed on at least one surface of the first printed layer and the second printed layer.

The light scattering layer may be an organic thin film or an optical film on whose surface concavo-convex patterns are formed.

A reflecting layer may be formed between the second printed layer and the touch substrate.

The touch substrate may be an upper substrate of a display panel.

The sensing electrodes may include first sensing electrodes formed to be coupled in a first direction and second sensing electrodes formed to be coupled in a second direction that intersects the first direction.

BRIEF DESCRIPTION OF THE DRAWINGS

Features will become apparent to those of skill in the art by describing in detail example embodiments with reference to the attached drawings in which.

DETAILED DESCRIPTION

Figure 1A:
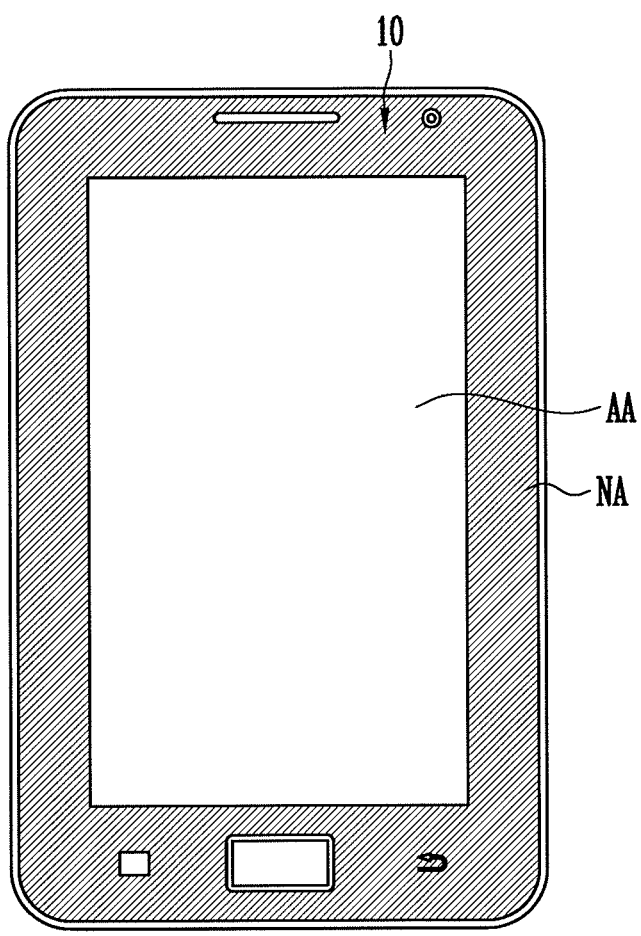
FIGS. 1A and 1B are plan views schematically illustrating an example of a touch screen panel.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Like reference numerals refer to like elements throughout.

Figure 1B:
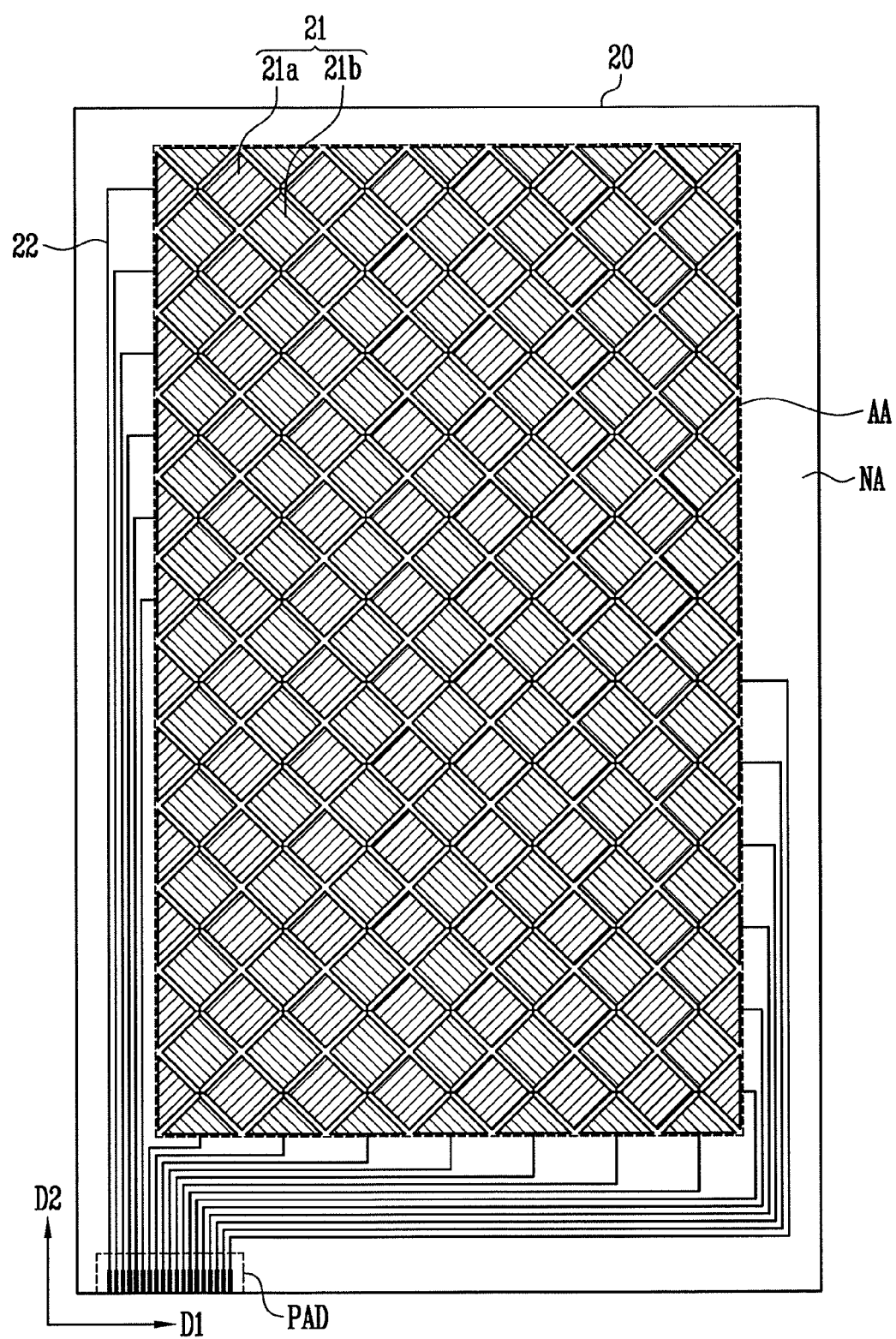

FIGS. 1A and 1B are plan views schematically illustrating an example of a touch screen panel.

FIG. 1A is a plan view illustrating a window substrate 10 of a touch screen panel. FIG. 1B is a plan view illustrating a touch substrate 20 that faces the window substrate 10 of FIG. 1A.

Referring to FIG. 1A, a touch screen panel according to an example embodiment may be provided in a portable terminal such as a smart phone. The window substrate 10 may be provided on a front surface of the touch screen panel.

The window substrate 10 may be formed of a glass material having light transmissivity or synthetic resin such as acryl.

In the example embodiment shown in FIG. 1A, the window substrate 10 is divided into an active area AA and a non-active area NA. The non-active area NA is outside the active area AA.

The active area AA, in which an image is displayed, is set as a touch active area in which a touch input may be performed.

The non-active area NA is an opaque, for example, black light shield area, formed along a frame of the active area AA and surrounds the active area AA in which the image is displayed.

In general, since the window substrate 10 is a transparent substrate, a color of the non-active area NA is determined by a color of a later-described printed layer. In particular, according to the present example embodiment, the color of the printed layer is set as a selected one among chromatic colors so that a diversified color window may be provided as compared to a unified black window.

In addition, in the non-active area NA, a trademark or a telecommunication company logo of a mobile telephone may be printed. The non-active area NA covers conductive patterns outside sensing electrodes formed in the active area AA.

Referring to FIG. 1B, a touch substrate 20 may be provided on a rear surface of the window substrate 10 of FIG. 1A. The touch substrate 20 may include sensing electrodes 21 formed in the active area AA and outside wiring lines 22 formed in the non-active area AA and coupled to the sensing electrodes 21.

In the present example embodiment, the touch substrate 20 has the same size and shape as those of the window substrate 10. The active area AA and the non-active area NA overlap each other.

The touch substrate 20 may be realized by a flexible and transparent material having high heat and chemical resistances. The touch substrate 20 may be a thin film substrate formed of, e.g., polyethylene terephthalate (PET), polycarbonate (PC), acryl, polymethyl methacrylate (PMMA), triacetyl cellulose (TAC), polyether sulfone (PES), polyimide (PI), etc.

The sensing electrodes 21 of the touch substrate 20 according to the present example embodiment are dispersed and arranged in the active area AA. The sensing electrodes 21 may include a plurality of first sensing electrodes 21a electrically coupled to each other in a first direction D1, and a plurality of second sensing electrodes 21b dispersed and arranged between the first sensing electrodes 21a so as not to overlap the first sensing electrodes 21a and electrically coupled to each other in a second direction D2 that intersects the first direction D1.

In the present example embodiment, the first sensing electrodes 21a and the second sensing electrodes 21b are alternately arranged to be coupled in different directions. For example, the first sensing electrodes 21a are coupled in a row direction (a horizontal direction) and are coupled to the outside wiring lines 22 in units of row lines, and the second sensing electrodes 21b are coupled in a column direction (a vertical direction) and may be coupled to the outside wiring lines 22 in units of column lines.

The sensing electrodes 21 may be formed of a transparent electrode material such as ITO so that light may be transmitted through the sensing electrodes 21. The sensing electrodes 21 may be formed by depositing the conductive material on the touch substrate 20 and patterning the deposited conductive material by a photoresist method.

A touch sensing method may include an electro-capacitive method, a resistance method, a surface acoustic wave method, and an infrared ray (IR) method. In the electro-capacitive method, a change in capacitance that the conductive sensing electrodes form with other peripheral sensing electrodes or a ground electrode when a human hand or an object contacts the touch screen panel is sensed so that a contact position is converted into an electrical signal.

The outside wiring lines 22 couple the first sensing electrodes 21a and the second sensing electrodes 21b to an external driving circuit in units of lines in the first direction D1 and the second direction D2. The outside wiring lines 22 are electrically coupled to, for example, the first and second sensing electrodes 21a and 21b in units of row and column lines to couple the first and second sensing electrodes 21a and 21b to an external driving circuit such as a position detecting circuit through a pad unit PAD.

The outside wiring lines 22 are arranged in the non-active area NA outside the touch screen panel to avoid the active area AA in which an image is displayed. The outside wiring lines 22 may be formed of a low resistance metal material such as Mo, Ag, Ti, Cu, Al, and Mo/Al/Mo. The outside wiring lines 22 may be formed of a different material from a transparent electrode material used for forming the sensing electrodes.

In another embodiment, the sensing electrodes may be realized in the form of metal meshes, i.e., the sensing electrodes may be formed not by a transparent conductive material but instead by minute metal lines.

The shape, material, and structure of the touch substrate 20, the sensing electrodes 21 formed on the touch substrate 20, and the outside wiring lines 22 may vary and the present example embodiment is not limited to the above.

Figure 2:
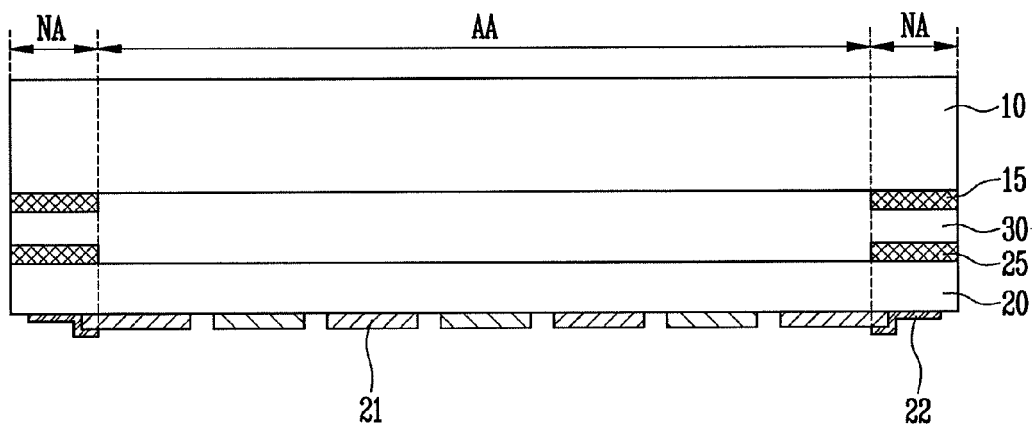
FIG. 2 is a sectional view of a touch screen panel according to an example embodiment.

FIG. 2 is a sectional view of a touch screen panel according to an example embodiment.

Referring to FIG. 2, a touch screen panel according to the present example embodiment has a lamination structure in which the window substrate 10 and the touch substrate 20 are combined with each other by an adhesive layer 30. A first printed layer 15 is formed on the window substrate 10 and a second printed layer 25 that faces the first printed layer 15 is formed on the touch substrate 20.

The touch screen panel according to the present example embodiment may realize a color window of various colors. A color of the color window is determined by a color of the printed layer, as described in further detail below. As a thickness of the printed layer is increased, the adhesive layer for having the window adhere to a lower structure is also increased in order to overcome a step difference.

In the touch screen panel according to the present invention, the printed layer is divided into the window substrate 10 and the touch substrate 20 based on the adhesive layer 30. Therefore, an increase in a thickness of the adhesive layer in accordance with an increase in the thickness of the printed layer may be minimized. As a result, it may be possible to provide a touch screen panel capable of realizing various colors while minimizing an increase in a thickness of a product.

In the present example embodiment, the first printed layer 15 is arranged in the non-active area NA and is formed under the window substrate 10, and the second printed layer 25 is arranged in the non-active area NA and is formed on the touch substrate 20 to face the first printed layer 15.

Here, the touch substrate 20 may have a structure in which the sensing electrodes 21 are formed on a thin film, or a structure in which the sensing electrodes 21 are formed on an upper substrate of a display panel (not shown).

The display panel may be, e.g., an organic light emitting display panel or liquid crystal display (LCD) panel integrated with a touch screen.

In addition, as illustrated in the drawing, the sensing electrodes 21 and the outside wiring lines 22 may be provided on a lower surface of the touch substrate 20 or, in another embodiment, on an upper surface of the touch substrate 20.

In addition, a protective layer (not shown) may be formed on the sensing electrodes 21 and the outside wiring lines 22.

One or more of the first and second printed layers 15 and 25 may have a multi-layer structure. For example, a single layer that forms the printed layer may have a thickness of about 4 µm to about 8 µm. In the case of a black window, the printed layer may have a one or two-layer structure. In the case of the color window, the printed layer may have a multi-layer structure in order to prevent patterns under the printed layer from being visible and to realize a color sense.

The printed layer having the multi-layer structure may be formed by a screen printing method through, e.g., double tone printing.

The first and second printed layers 15 and 25 may have different colors in order to realize a composite color.

In addition, the first and second printed layers 15 and 25 may have the same size and thickness to overlap each other. The step difference of the printed layer that may be covered by the adhesive layer 30 may be the same in upper and lower surfaces. Thus, an optimized thickness of the adhesive layer 30 may be obtained when the first and second printed layers 15 and 25 have the same thickness.

The adhesive layer 30 may be formed of an optically clear adhesive (OCA), but embodiments are not limited thereto.

The adhesive layer 30 may have a thickness of about 50 µm to about 200 µm in accordance with the thickness of the first and second printed layers 15 and 25.

Figure 3:
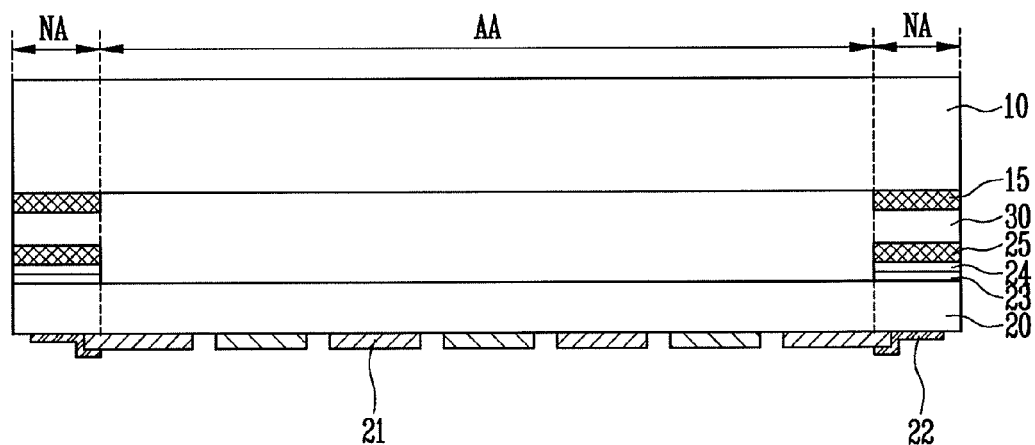
FIG. 3 is a sectional view of a touch screen panel according to another example embodiment.

FIG. 3 is a sectional view of a touch screen panel according to another example embodiment.

The above-described elements and the elements denoted by the same reference numerals may be described with reference to the above-described disclosure unless described to the contrary, and redundant description will be omitted.

Referring to FIG. 3, in the touch screen panel according to the present example embodiment, a reflecting layer 23 and a light scattering layer 24 are further formed between the touch substrate 20 and the second printed layer 25.

The reflecting layer 23 reflects light incident from the outside. Thus, it may be possible to effectively prevent the patterns of the non-active area NA from being visible, and to realize the first and second printed layers 15 and 25 to have a vivid color.

The light scattering layer 24 may be formed of an organic thin film or an optical film on whose surface concavo-convex patterns (e.g., minute patterns) are formed, and may be coated with a light dispersant (e.g., particles).

The light scattering layer 24 may improve a color realizing characteristic of the second printed layer 25 and may be formed on, e.g., at least one surface of the first and second printed layers 15 and 25.

As described above, the reflecting layer 23 and the light scattering layer 24 may be formed to improve the color realizing characteristic of the first and second printed layers 15 and 25 and to minimize the thickness of the first and second printed layers 15 and 25.

Figure 4:
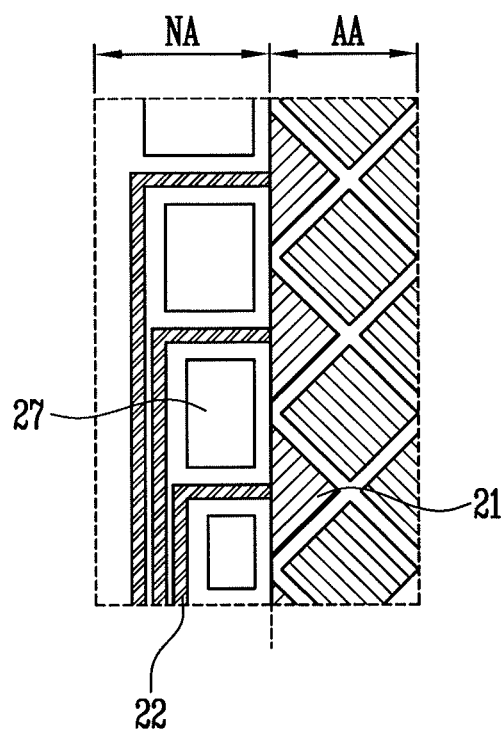
FIG. 4 is a partially enlarged view of an outside wiring line area of a touch screen panel according to still another example embodiment.

FIG. 4 is a partially enlarged view of an outside wiring line area of a touch screen panel according to still another example embodiment.

The above-described elements and the elements denoted by the same reference numerals may be described with reference to the above-described disclosure unless described to the contrary, and redundant description will be omitted.

Referring to FIG. 4, the touch screen panel according to the present example embodiment includes reflecting patterns 27 arranged between the outside wiring lines 22 of the touch substrate 20 instead of the reflecting layer 23 of the above-described embodiment.

The reflecting patterns 27 may be formed in the same layer and of the same material as the outside wiring lines 22.

The reflecting patterns 27 may be separated from the outside wiring lines 22 in the form of an island and, in another embodiment, may be formed between the sensing electrodes 21 and the outside wiring lines 22 to be electrically coupled to each other with enlarged wiring lines.

The reflecting patterns 27 reflect light incident from the outside. Thus, it may be possible to effectively prevent the patterns of the non-active area NA from being visible and to realize the first and second printed layers 15 and 25 to have a vivid color.

In addition, the reflecting patterns 27 may be formed in the same layer as the outside wiring lines 22, such that the reflecting layer 23 may be excluded. Therefore, it may be possible to reduce a thickness of a product.

By way of summation and review, sensing electrodes in a touch screen panel may be formed in a display area where an image is displayed so that a touch event generated in the display area is recognized as an input signal. Thus, in an image display device including the touch screen panel, the display area in which an image is displayed may be set as an active area in which a touch input may be performed. A printed layer (a light shield layer or a decoration layer) may be formed in a frame area that is a non-display area of the touch screen panel to prevent patterns such as outside wiring lines from being visible. A printed layer for realizing a black color may have a thickness of about 4 µm to about 8 µm and may have a one or two-layer structure.

In order to realize various colors such as white, pink, and cyan, the printed layer may have a multi-layer structure, such as a three to five-layer structure. Thus, in the case of a black window, the printed layer may be realized to be thin. In the case of a color window, in order to realize the color of the printed layer, the printed layer of the multi-layer structure or the printed layer of an increased thickness may be used. As the thickness of the printed layer is increased, a thickness of an adhesive layer for having the window adhere to a lower structure may also be increased in order to overcome a step difference (if the thickness of the adhesive layer is not increased when the thickness of the printed layer is increased, bubbles may be generated by the step difference). On the other hand, reducing the thickness of the printed layer may deteriorate a color realizing characteristic, and the outside wiring lines that overlap the printed layer may be visible.

The step difference caused by the printed layer may be covered by the adhesive layer. The step difference covered by the adhesive layer may be increased in proportion to the thickness of the adhesive layer. Thus, the thickness of the adhesive layer may also be increased. As a result, in order to realize various colors of the printed layer, an entire thickness of a product may be increased.

As described above, embodiments relate to a touch screen panel integrated with a window. Embodiments may provide a touch screen panel for realizing various colors of a window while minimizing an increase in a thickness of a product. According to embodiments, a printed layer may be divided based on the adhesive layer so as to minimize an increase in the thickness of the adhesive layer in accordance with an increase in the thickness of the printed layer. As a result, it may be possible to provide a touch screen panel capable of realizing various colors while minimizing an increase in a thickness of a product.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen panel, comprising:
   a window substrate divided into an active area and a non-active area, the non-active area being outside the active area, the window substrate having a first printed layer formed in the non-active area;
   a touch substrate including sensing electrodes formed in the active area and having a second printed layer that faces the first printed layer formed in the non-active area; and
   an adhesive layer interposed between the window substrate and the touch substrate, wherein at least a portion of the adhesive layer is interposed between the first printed layer and the second printed layer in a thickness direction of the touch screen panel,
   wherein one surface of the adhesive layer covers a first surface of the first printed layer and another surface of the adhesive layer covers a first surface of the second printed layer, the first surface of the first printed layer facing the first surface of the second printed layer with the adhesive layer interposed therebetween, the first printed layer, the adhesive layer, and the second printed layer being stacked in the stated order in the thickness direction of the touch screen panel, and
   wherein the thickness direction of the touch screen panel is a direction orthogonal to a plane of a surface of the touch substrate such that a line extending in the thickness direction separately passes through the first printed layer, the adhesive layer, and the second printed layer in the stated order.

2. The touch screen panel as claimed in claim 1, wherein at least one of the first and second printed layers has a multi-layer structure.

3. The touch screen panel as claimed in claim 1, wherein the first and second printed layers have different colors.

4. The touch screen panel as claimed in claim 1, wherein the first and second printed layers have the same thickness.

5. The touch screen panel as claimed in claim 1, wherein the touch substrate further includes outside wiring lines formed in the non-active area and coupled to the sensing electrodes.

6. The touch screen panel as claimed in claim 5, wherein the sensing electrodes and the outside wiring lines are formed in the same layer.

7. The touch screen panel as claimed in claim 5, wherein the touch substrate further includes reflecting patterns formed between the outside wiring lines.

8. The touch screen panel as claimed in claim 5, wherein the outside wiring lines include one or more of Ag, Ni, Cu, Mo/Al/Mo, or an Ag—Pd—Cu alloy.

9. The touch screen panel as claimed in claim 1, wherein the adhesive layer is formed of an optically clear adhesive.

10. The touch screen panel as claimed in claim 1, wherein the adhesive layer has a thickness of about 50 μm to about 200 μm.

11. The touch screen panel as claimed in claim 1, wherein a light scattering layer is formed on at least one surface of the first printed layer and the second printed layer.

12. The touch screen panel as claimed in claim 1, wherein the light scattering layer is an organic thin film or an optical film on whose surface concavo-convex patterns are formed.

13. The touch screen panel as claimed in claim 1, wherein a reflecting layer is formed between the second printed layer and the touch substrate.

14. The touch screen panel as claimed in claim 1, wherein the touch substrate is an upper substrate of a display panel.

15. The touch screen panel as claimed in claim 1, wherein the sensing electrodes include first sensing electrodes formed to be coupled in a first direction and second sensing electrodes formed to be coupled in a second direction that intersects the first direction.

16. The touch screen panel as claimed in claim 1, wherein the one surface of the adhesive layer, the first surface of the first printed layer, the other surface of the adhesive layer, and the first surface of the second printed layer are parallel with one another and with the plane of the surface of the touch substrate.

* * * * *